United States Patent [19]
Lee

[11] Patent Number: 5,988,564
[45] Date of Patent: Nov. 23, 1999

[54] AIRCRAFT TURNAROUND APPARATUS

[75] Inventor: Richard J Lee, Hartford, Wis.

[73] Assignee: Lee Precision Inc., Hartford, Wis.

[21] Appl. No.: 09/022,266

[22] Filed: Feb. 11, 1998

[51] Int. Cl.$^6$ .................................. B64F 1/00; B64F 1/24
[52] U.S. Cl. ...................... 244/114 R; 244/115; 244/116
[58] Field of Search ............................... 244/114 R, 115, 244/116

[56] References Cited

U.S. PATENT DOCUMENTS

| | | | |
|---|---|---|---|
| 1,855,534 | 4/1932 | Williams | 244/114 R |
| 2,395,528 | 2/1946 | Anderson | 244/114 R |
| 2,964,144 | 12/1960 | Wheeler | 244/114 R |
| 3,599,809 | 8/1971 | Gresham | 244/114 R |
| 3,670,464 | 6/1972 | Cutter | 244/114 R |
| 3,830,452 | 8/1974 | Seay | 244/116 |
| 3,915,319 | 10/1975 | Fairburn | 244/114 R |
| 5,102,091 | 4/1992 | Craig | 244/116 |

*Primary Examiner*—Charles T. Jordan
*Assistant Examiner*—Charles R. Ducker, Jr.
*Attorney, Agent, or Firm*—Ryan Kromholz & Manion

[57] ABSTRACT

A long arm for an aircraft turnaround apparatus mounted at one end to the floor of an aircraft hanger for swinging about a vertical axis causing a nose-wheel carriage at the free end of the arm to follow a semicircular path. The nose-wheel of an incoming aircraft runs onto the carriage such that its imaginary lateral rotation axis is practically coincident with the arm axis so when the arm swings, the aircraft's ground supported landing gear traces a semicircle. The carriage has a chock bar which stops the aircraft from overtraveling the carriage. One chock bar version requires manual insertion and removal and another automatically latches in the stopping position but is unlatched by an aircraft leaving the carriage after which a spring restores the chock to the latched position. An optional spring system can restore the arm and carriage to a nose-wheel receiving position after a turned around aircraft has departed. A device is fastened to the hanger floor such that the oncoming carriage engages it upon approaching its final nose-wheel receiving position. The device gradually retards the rotational movement of the arm and carriage and finally stops their movement.

19 Claims, 5 Drawing Sheets

AIRCRAFT TURNAROUND APPARATUS

BACKGROUND OF THE INVENTION

The invention disclosed herein pertains to apparatus for turning around an aircraft from a position, for example, where its nose is pointing inwardly of a hangar to a position wherein the nose is pointing outwardly of the hangar in readiness for taxying out of the hangar. The new turnaround apparatus is especially applicable to small aircraft that typically have a nose-wheel and a pair of main fuselage support or landing wheels located aft of the nose-wheel under the fuselage for the wheels to provide three-point support of the aircraft on the ground.

The traditional method of parking or storing an aircraft in a hangar is to engage a hand-held towbar to the steerable nose-wheel to first turn the aircraft around so its tail is leading into the hangar and then pushing the aircraft further with its tail pointed into the hangar and with its nose pointed out of the hangar. This operation must be performed very carefully because even superficial contact with a rigid object can damage the aircraft and make it unairworthy. Any repair to an aircraft is costly. Any but the smallest aircraft requires at least two persons to turn it around when the towbar method is used, one person to handle the towbar and one person or even another person for pushing and observing to assure that all points on the aircraft are passing obstacles with safe clearance.

Scaled down models of engine driven tugs and tractors of the type used for moving large aircraft are also available for turning around small aircraft in a hangar. However, these motorized drivers are expensive and are used so infrequently that they are not considered by many aircraft owners to be cost justified. Moreover, because the engines are operated infrequently and for short intervals they are inclined to rust and otherwise deteriorate rapidly.

Winches are also available for towing and turning an aircraft around. A winch is mounted in the rear region of the hangar opposite of the hangar door and the aircraft is towed in backwards with a cable leading from the winch. Even when using a winch it is desirable to have two persons collaborate in performing the task, one person for operating the winch and the other person for steering the nose-wheel. If only one person is performing the task, the aircraft is put in place slowly, inch-by-inch because that person is required to switch back and forth between operating the winch and alternatingly observing clearance and steering the nose-wheel.

SUMMARY OF THE INVENTION

The new aircraft parking and turnaround apparatus described herein is notable for avoiding the difficulties and hazards of using pre-existing devices and methods for positioning and turning an aircraft around inside or outside of a hangar.

The new turnaround apparatus takes advantage of the fact that small aircraft have a nose-wheel and a pair of landing wheels on a common axis set rearwardly, usually under the wing, along the fuselage from the nose-wheel with the landing wheels substantially symmetrical to an imaginary vertical axis or central point on the airplane so the point can serve as an imaginary vertical axis for turning the aircraft around on a surface such as a hangar floor. When an aircraft is rotated about this point the wing and the tail extremities are at equal radial distances from the center-of-rotation at the point so the extremities will trace an arc as the aircraft is being turned around through to an angle of 180°.

According to the invention, the new turnaround apparatus comprises a nose-wheel receiving carriage connected to the end portion of a long arm that is pivotally connected to a bracket which is fixed to the floor of the hangar to provide for the arm to swing about a vertical axis. The nose-wheel carriage is provided with wheels that run on the hangar floor and follow an arc having a radius extending from the vertical pivot axis for the arm so the wing tips and tail portion of the aircraft trace over the same radius arc and the carriage traces a smaller radius arc while the aircraft is being turned around. When the aircraft taxies into the hangar, the carriage is in its rearmost position in the hangar. The aircraft enters the hangar with its nose leading and its movement stops when the nose-wheel runs onto the carriage and up against a releasable chock bar or stop member on the carriage. With most small aircraft and hangar configurations, the tail portion of the aircraft may still be extending outwardly of the hangar door before the aircraft is turned around to a position where it would be in readiness for taxying straightforward out to a runway.

After the nose-wheel is on the carriage and the engine is turned off, the pilot deplanes and pushes on the wing tip or tail for the carriage, and of course, for the nose-wheel resting thereon to move along a semicircular arc, that is, through an angle of 180° which results in the aircraft being turned end-for-end so its nose is now pointed out of the hangar in readiness for taxying straight out onto a runway for take-off when the next flight time arrives.

While the carriage moves along an arc on a surface during the turnaround operation, the main pair of landing wheels under the wing and fuselage run in a semicircle whose center or imaginary vertical axis of rotation may be offset, that is, not exactly coincident with the mid-point of the aircraft and the carriage arm axes but the small offset has been shown to be immaterial to the turnaround operation. The offset is most commonly no more than about 5 inches from true center which is small compared to the wing spread of most small aircraft which is about 360 inches.

The turnaround apparatus has other important features, some of which are present in all models and others of which are optional and are provided in the top level models.

For example, all models are intended to have a nose-wheel guide member mounted to the carriage and angulated relative to the pivot or swing arm of the carriage to deflect and direct the nose-wheel of an incoming aircraft onto the center of the carriage if the nose-wheel is somewhat out of alignment with the center of the platform for the nose-wheel on the carriage.

A choice of releaseable chocks or stops for the nose-wheel are provided on the carriage. One type of chock is simply a bar or pipe extending across the platform of the carriage in the path of the nose-wheel. In this model the bar must be removed manually from appropriate sockets on the carriage and set aside to permit the nose-wheel to run off the carriage when the aircraft is to exit the hangar. Of course, before the aircraft is driven into the hangar the chock is reset on the carriage so it will serve as a stop for the nose-wheel. On the other hand, a top-of-the-line model has a self-restoring bar chock. It is pivotally mounted to the previously mentioned nose-wheel guide member and is forced by a spring to engage releasably with a latching device on the carriage. When the nose-wheel starts to advance off the carriage the wheel encounters the bar with sufficient force to overcome the spring restoring force and the holding force of the latch. The chock bar is then pushed by the nose-wheel out of interfering position when it is to run off the carriage until the bar becomes nearly parallel to the line of movement of the nose-wheel so the wheel passes the bar and goes off the carriage. When cleared of the nose-wheel, the chock bar pivots under the influence of the spring to latching condition again.

An optional but advantageous feature of the new turnaround apparatus is in providing for automatic return or resetting of the aircraft receiving carriage as soon as the aircraft has separated from the apparatus for exiting the hangar so that when the aircraft returns its nose-wheel can be driven directly onto the carriage in preparation for executing the turnaround operation.

Another feature of the turnaround apparatus is a tube or bar that has one end fastened to the long pivot arm for the carriage adjacent the carriage and is angulated outwardly for deflecting the main landing wheels so they avoid striking the carriage during automatic return.

The semicircular arc through which the carriage moves for the purpose of turning the aircraft through an angle of 180° to reverse it is arrested by means of a hook-like springy metal strip that is anchored to the hangar floor. The hook-strip is inclined relative to the hangar floor in the direction in which it is approached by the carriage so that the springiness of the strip will keep it pressed against the leading edge of the carriage to assure that the hook will engage the carriage and stop it during the aircraft turnaround operation.

The first installation of the turnaround apparatus provided for demonstrating that the apparatus facilitated turnaround using a small fraction of the force required of one or two persons who are turning an aircraft around by traditional non-mechanical assisted methods as a result of the long lever arm that exists when pushing on the wing or tail.

How the foregoing features of the new aircraft turnaround apparatus are implemented will be described in more detailed description of the structure and functions of the turnaround apparatus which will now be set forth in reference to the accompanying drawings.

DESCRIPTION OF A PREFERRED EMBODIMENT

Figure 1:
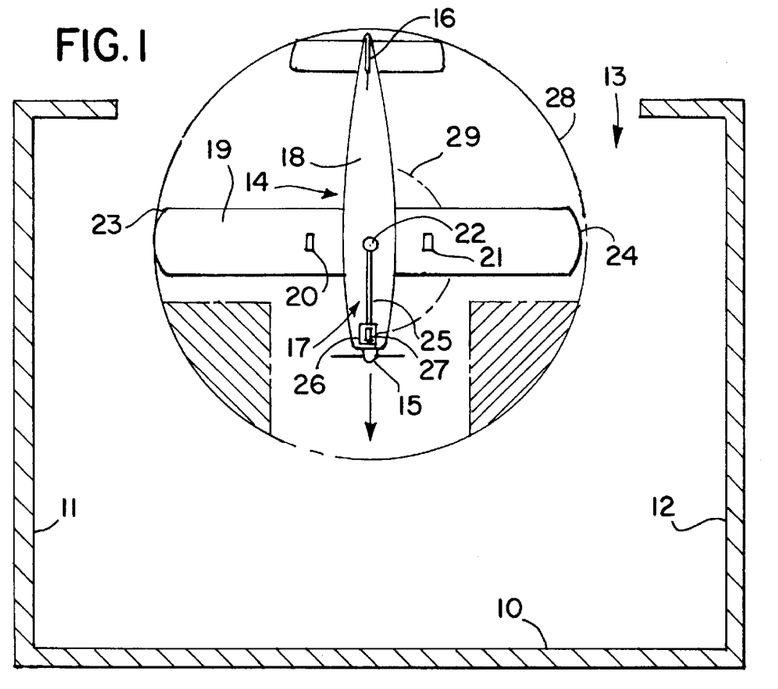
FIG. 1 is a diagram of an aircraft as it is positioned with its nose pointed into a hangar which is the case when the aircraft has just entered through the hangar doorway and becomes engaged with the carriage of the turnaround apparatus the shades area of the figure showing the small amount of storage space that is lost due to turning the aircraft around.

Attention is invited to FIG. 1 which depicts a hangar comprised of a rear wall 10, side walls 11 and 12, and a doorway 13. An aircraft, generally designated by the numeral 14, has just moved into the hangar through doorway 13 and has its nose-wheel 27 presently resting on the carriage 26 of the new turnaround apparatus which is generally designated by the numeral 17 and is actually under the aircraft. The fuselage of the aircraft is marked 18 and its wing is marked 19. The landing gear of the aircraft is not completely visible in FIG. 1 but two rubber tired landing wheels, which are under the wing are marked 20 and 21. The imaginary vertical axis about which the aircraft is turned around with the apparatus is identified by the numeral 22. The semicircular dashed line or arc 28 is the imaginary arc traced by the wing tip extremities 23 and 24 and the tail end extremity 16 when the aircraft is rotated through an angle of 180° about imaginary vertical axis 22. The carriage 26 traces a smaller radius arc 29 concentric to axis 22. The aircraft depicted for illustrative purposes is a single engine craft but aircrafts with two or three engines may also be turned around on the new apparatus.

Figure 2:
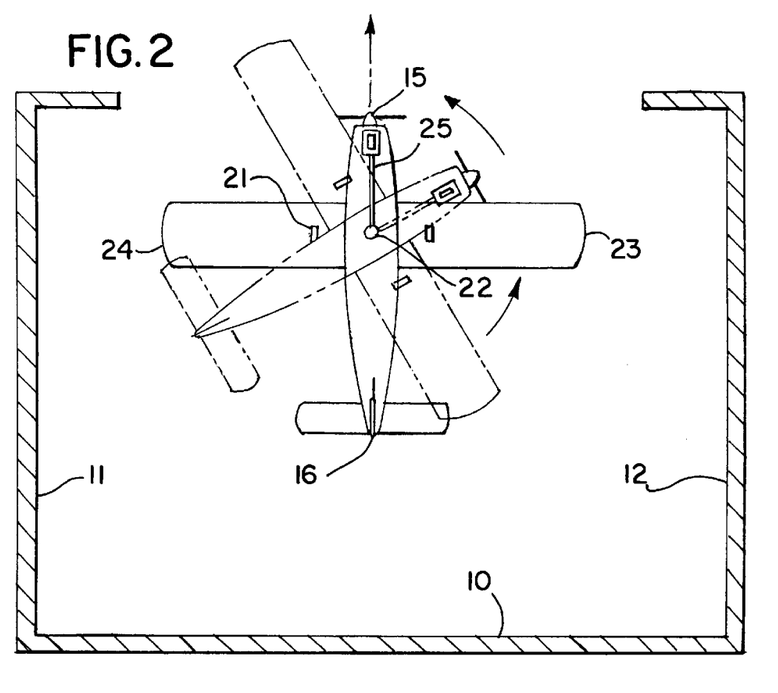
FIG. 2 is a diagram showing the outline of the aircraft in phantom lines while it is passing through one of its angles of rotation induced by the turnaround apparatus and showing in solid lines the outline of the aircraft when it is completely turned around and has its nose pointed outwardly of the hangar.

FIG. 2 shows the aircraft in phantom lines where it is turned partially around and is shown in solid lines to illustrate its position when it is fully turned around about vertical axis 22.

In FIGS. 1 and 2 the turnaround apparatus 17 is shown to comprise an arm assembly 25 which has a carriage 26 at one end and is adapted to swing around vertical axis 22. The small rectangle on the carriage 26 is representative of the nose-wheel of an aircraft which is indicated by the numeral 27.

Figures 3, 4, 5:
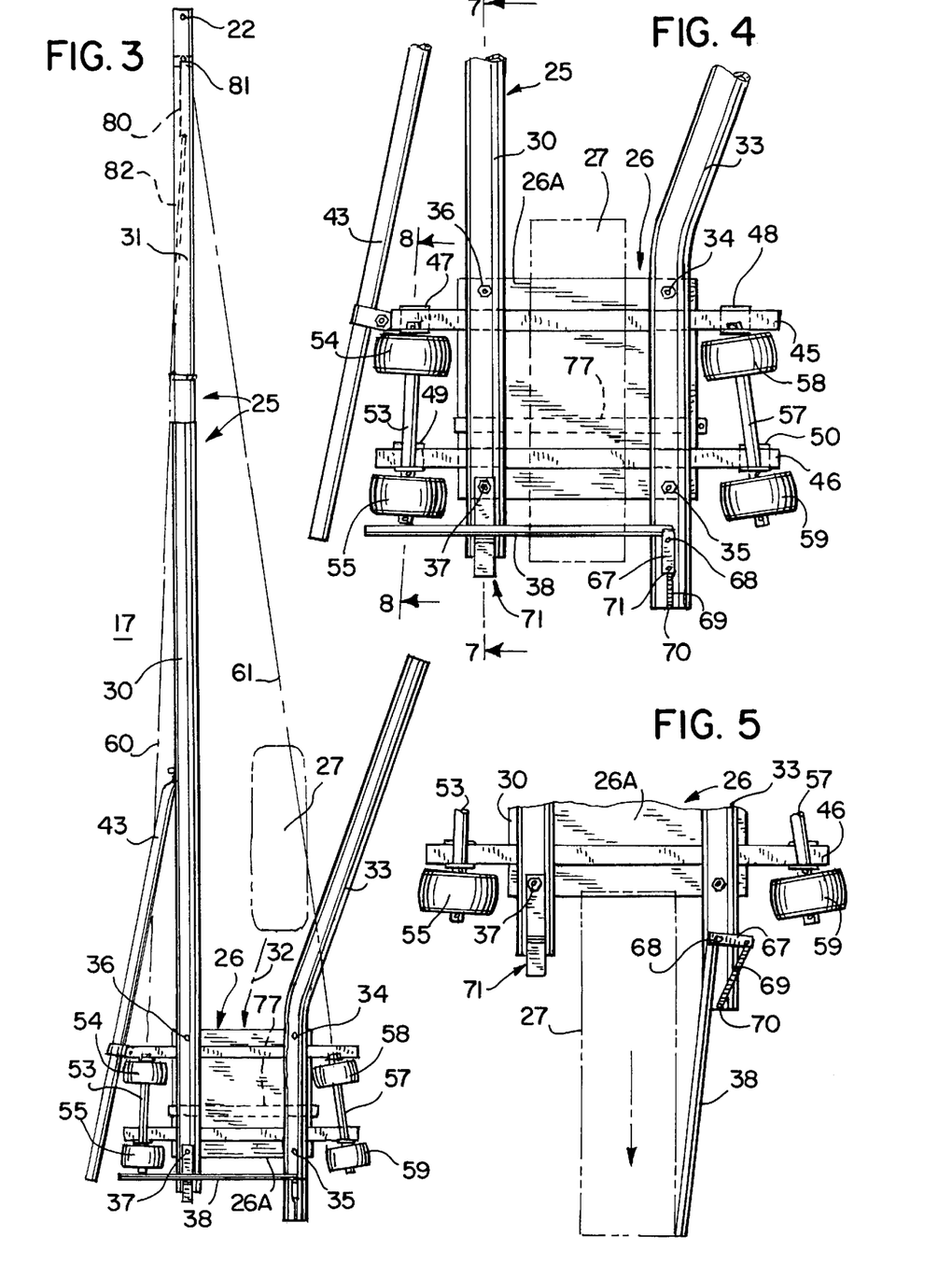
FIG. 3 is a top plan view of the new turnaround apparatus wherein the aircraft nose-wheel is outlined in phantom and is approaching the nose-wheel carriage of the apparatus.
FIG. 4 is a fragmentary view of the nose-wheel carriage magnified relative to the preceding figure, and showing the outline of an aircraft nose-wheel that is now resting on the platform of the carriage with any further advance of the wheel being blocked by a chock bar.
FIG. 5 is a fragmentary top plan view of the nose-wheel carriage showing the nose-wheel in phantom when the wheel has run off the platform of the carriage after having unlatched the chock bar manually.

FIG. 3 is a plan view of the turnaround apparatus 17 in a position in which it is disposed before the aircraft turnaround. The arm assembly 25 is comprised of two interfitted tubular sections 30 and 31. The arm assembly 25 is made in the two sections 30 and 31 to provide for adjusting its length so as to locate the arm pivot axis 22 as close as possible into perpendicularity with the horizontal axis about which landing wheels 20 and 21 turn. The arm assembly 25, as mentioned earlier, swings about a vertical axis 22 through a 180° angle. The nose-wheel carriage is designated generally in FIG. 3 by the numeral 26 as it is in FIG. 1. A nose-wheel 27 of an arriving aircraft is depicted in phantom lines and is shown in motion toward the carriage 26 as indicated by the dashed arrow marked 32. The carriage 26 in FIG. 3 corresponds with its position in FIG. 1 where it is represented as being nearer to the rear wall 10 of the hangar than the pivot point 22 at this time before the aircraft is turned around. If the nose-wheel 27 is coming in towards the carriage slightly out of alignment with the carriage as it is depicted in FIG. 3, the nose-wheel will encounter a tubular guide member 33 which deflects the nose-wheel or redirects it so that the wheel will arrive on the carriage properly positioned and be stopped. The tubular guide member 33 is fastened to the carriage by means of bolts 34 and 35. Arm section 30 of arm 25 is also fastened at its distal end to carriage 26 by means of bolts 36 and 37. When the aircraft is turned around from its arrived position as depicted in FIG. 1 to its departure position as depicted in FIG. 2, the nose-wheel 27, which is on the platform 26A of carriage 26 when the aircraft comes to rest as in the case in FIG. 1, is still blocked by a chock bar 38 which has served to interfere with the nose-wheel over-running carriage 26, is moved out of the way as will be explained in detail momentarily, so it is clear for the nose-wheel to run out of the hangar while being followed with the main landing wheels 20 and 21. A deflector member 43 is mounted at an angle to arm section 30 for deflecting the landing wheels to avoid collision of the wheels with the carriage while the turnaround is automatically turned to home position.

Figure 7:
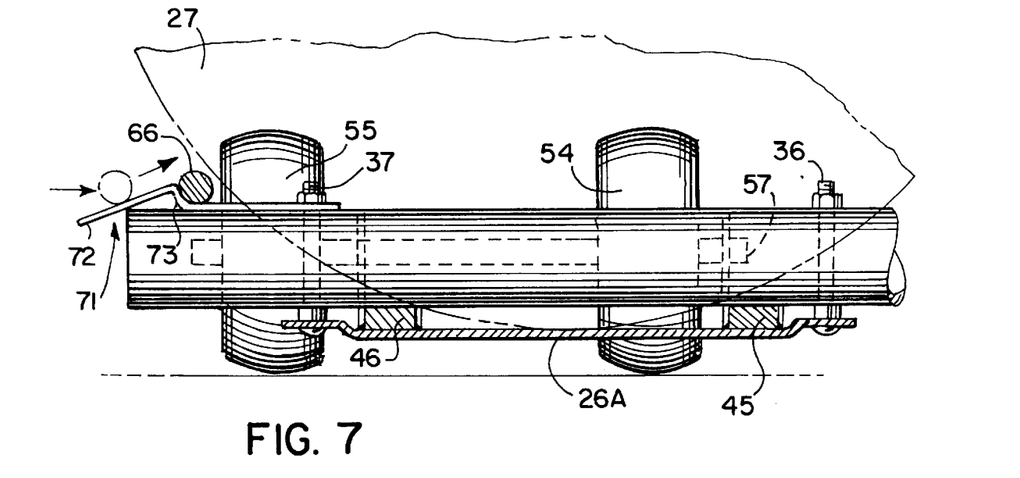
FIG. 7 is a side elevational view of the carriage along with a broken away piece of the tubular radial arm with which the carriage is guided in an arcuate path, this view showing a fragment of the nose-wheel on the carriage in phantom lines and also showing the latch for the chock bar and chock bar itself in section.
Figure 8:
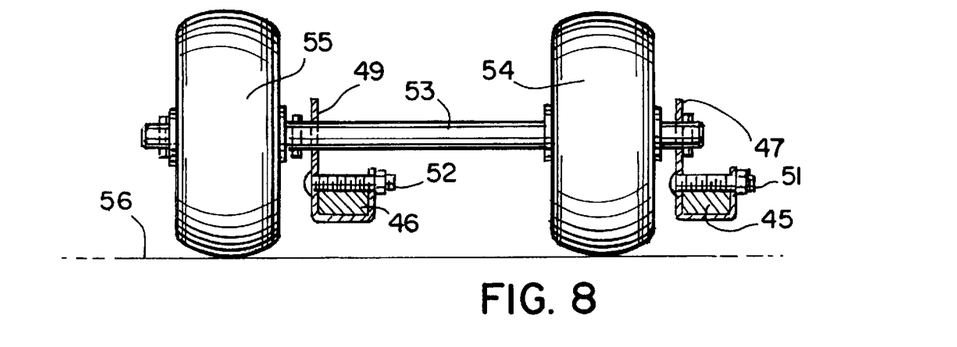
FIG. 8 is a side elevational view of one of the two pairs of carriage roller wheels as viewed to looking the direction of the arrows 8—8 in FIG. 4.

Refer now to the enlarged view of the carriage and its affiliated parts in FIG. 4. As previously mentioned, a nose-wheel carriage 26 is bolted to tubular members 30 and 33 by means of bolts 34–37. Nose-wheel 27, shown in phantom lines, is standing on a platform plate 26A of the carriage. The cross-sectional configuration of the plate 26A is exhibited in FIG. 7. Referring to FIG. 4 again, there are two crossbars 45 and 46 fastened to the top of platform plate 26A, preferably by welding. Two axle support brackets 47 and 48 are mounted to the end portions of crossbar 45 and two similar brackets 49 and 50 are mounted to crossbar 46. As is shown in FIG. 8, typical brackets 47 and 49 are clamped to crossbars 45 and 46 by means of bolts 51 and 52. Brackets 47–50 are adjustable on bars 45 and 46 to cause axles 53 and 57 to point to pivot axis 22. The adjustment is made to suit the aircraft. An axle 53 passes through the upstanding portion of brackets 47 and 49 for mounting a pair of carriage wheels 54 and 55 that run on the floor 56 of the hangar. The wheels are commercially available. As shown in FIG. 4, another axle 57 is supported in a pair of brackets 48 and 50. Axle 57 has wheels 58 and 59 journaled on it so the carriage rolls through an arcuate path by way of the wheels on the hangar floor 56. As shown in FIG. 3, the axes of the axles 53 and 57 project back along dashed lines 60 and 61 to the vertical pivot axis 22 for the carriage.

In FIG. 4, the nose-wheel 27 is stopped against a chock bar 38. The chock bar is unlatched manually prior to starting the aircraft's engine in contemplation of departing from the hangar. As shown in FIG. 4, chock bar 38 has a lever 67 fastened to one of its ends. The lever pivots about a pin 68 that is mounted to tubular guide member 33. A coil spring 69 is fastened at one end 70 to guide member 33 and is hooked at its other end to 100 to the lever 67. As shown in FIG. 5, when the nose-wheel 27 of the aircraft is driven in a direction for it to depart from the carriage, the leading face of the wheel reacts against chock bar 38 and swings it about its pivot 68 while at the same time loading or stretching spring 69. As soon as the nose-wheel 27 is clear of chock bar 38, the chock bar restores from its FIG. 5 position to its former FIG. 4 position. It is thus ready to stop nose-wheel 27 on the platform when the aircraft enters the hangar again with its nose leading. The chock bar 38 is latched with a sufficient force to not yield when the nose-wheel rolls onto the carriage platform and strikes the chock bar. The latch member is designated generally by the numeral 71. It is a specially configured bar that is bolted by means of bolt 37 to carriage arm section 30. A side elevational or profile view of the latch member 71 is visible in FIG. 7. The chock bar 38 is shown in that figure in solid lines when in the latched condition and in dashed lines as it is returning in the direction indicated by the arrows toward latched position by sliding along the angulated part 72 of the latch member 71. After traversing the angulated part 72 of the latch member 71, the chock bar 38 drops behind the riser portion 73 of the latch member. It must be unlatched manually before the pilot boards the aircraft for departure.

Figure 6:
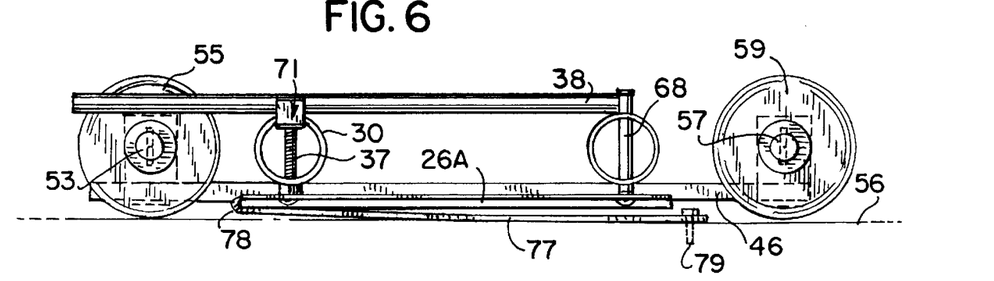
FIG. 6 is an elevational view of the carriage after its arcuate travel has been stopped in an angular position wherein the carriage is in readiness for receiving the nose-wheel before beginning a turnaround operation.
Figures 9, 10A, 10B:
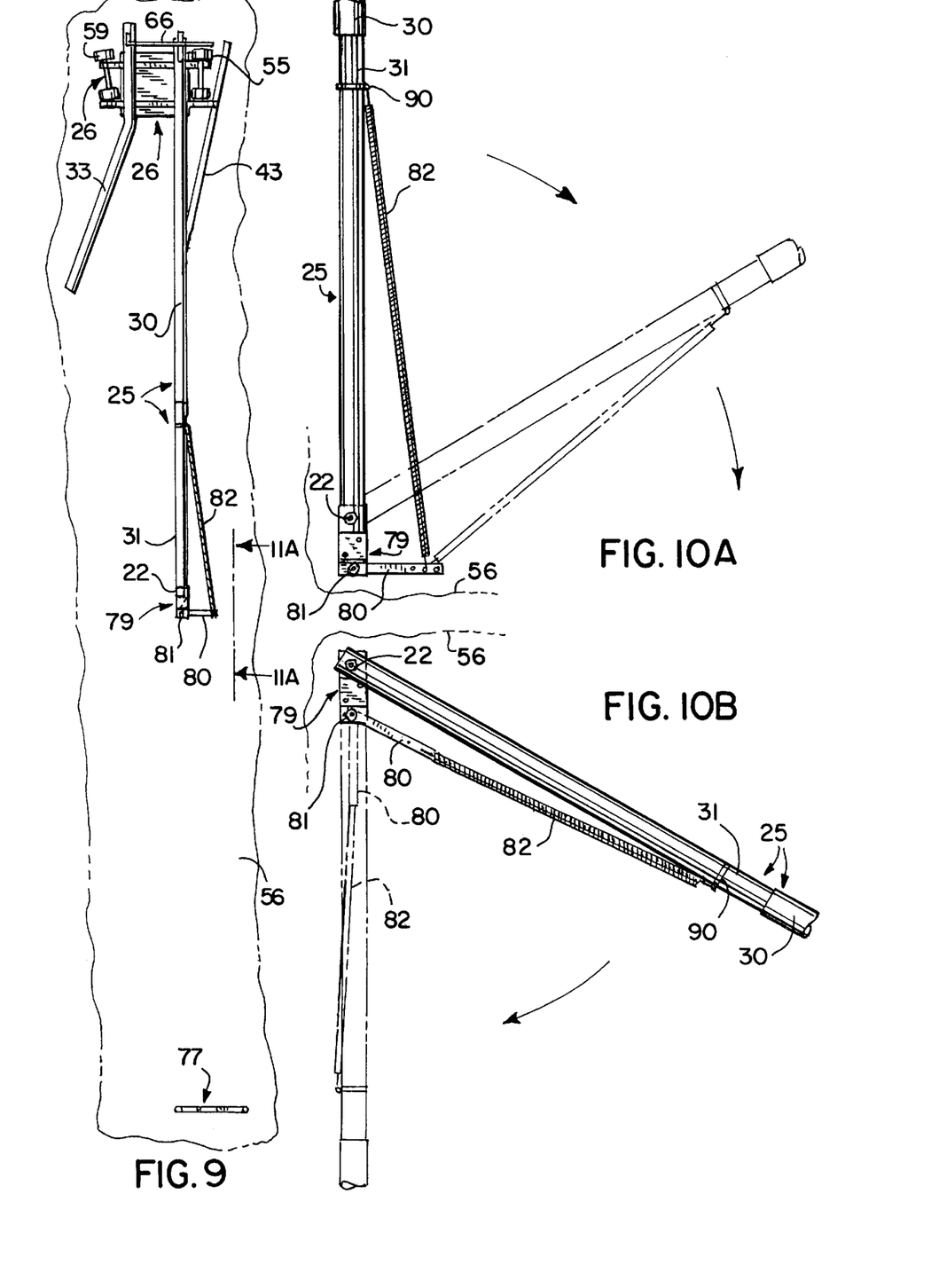
FIG. 9 is a top plan view of the entire turnaround apparatus positioned as it would be at a moment after the aircraft has left the carriage and is passing out of the hangar door, the arrow indicating the direction in which the pivot arm for the carriage is to be swung to reset the carriage for receiving an aircraft that has begun to enter the hangar.
FIG. 10A shows the swing arm for the carriage in solid lines where it is positioned similarly to its position in FIG. 9 before the resetting operation gets under way and shows the arm in phantom lines after it has executed about 45° of the 180° to reset position while being swung to and through that position under the influence of the resetting spring.
FIG. 10B shows the carriage support arm in solid lines pivoted further towards the reset position and shows in phantom lines the resetting spring and arm in final reset position.
Figure 12:
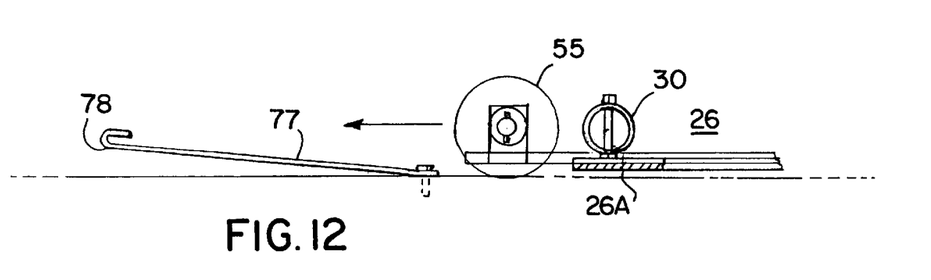
FIG. 12 shows the leading end of the nose-wheel carriage approaching a flat spring stop device with a hook for arresting carriage movement in a position for receiving an incoming nose-wheel.

FIG. 9 shows the carriage and the arm 25 on which it swings positioned where it would be when the aircraft is turned around and pointed outwardly and ready to leave the carriage and the hangar. When the carriage is diametrically opposite of its FIG. 9 position as it is in FIG. 3, it engages with a stop member 77 that is fastened to the hangar floor 56. The profile of the stop member 77 is visible in FIGS. 6 and 12. As is evident in FIG. 6, travel of the carriage along an arcuate path toward aircraft receiving position is arrested by having a hook 78 on stop member 77 catch the edge of the nose-wheel platform 26A of carriage 26. The stop member 77 is fastened to the hangar floor by means of anchor bolts such as the one marked 101. FIG. 12 shows the carriage approaching stop member 77. Here it is shown that the stop member 77 acts as flat spring resulting from it being bent with respect to the end region where it is fastened to the floor. The reason for this is to decelerate the aircraft to a gentle stop at the end of a turnaround and to assure that the hook portion 78 of the stop member will surely catch the edge of carriage platform 26A because the edge will run against the flat spring.

The mechanism for automatically restoring the carriage 26 to the incoming nose-wheel receiving position as in FIG. 3 after the aircraft has departed from the turnaround apparatus will now be described. As shown in FIG. 9, the vertical axis 22 for arm 25 is provided by a hangar-floor mounted bracket that is generally designated by the numeral 79. A link 80 is pivotally connected at 81 to bracket 79. One end of a spring 82 is hooked on link 80 and the other end is hooked to a clamp 90 to tubular section 31 of the carriage swing arm 25.

FIG. 10A is an enlargement of the structure just discussed. The purpose of spring 82 is to store energy for restoring the arm 25 and the carriage at the proper position against floor stop 77 for the carriage to be able to accept the nose-wheel of an incoming aircraft. Of course, as discussed earlier, the carriage was turned to the aircraft departure position in which it is depicted in FIG. 9 after it had received the nose-wheel of an incoming aircraft followed by swinging the arm 25 about its pivot 22.

In FIG. 10A, carriage resetting spring 82 is stretched a maximum amount as it is when the arm 25 is in its FIG. 9 position. When the weight of the aircraft is off the carriage, the force stored in spring 82 is sufficient to rotate the arm 25. The force directed along spring 82 can be resolved into two components of force one of which tends to rotate the arm 25 clockwise as depicted in FIG. 10A. The rotation continues over dead center, as shown in FIG. 10B, until the arm comes to a stop by reason of the carriage at the end of arm 25 engaging the floor mounted hook stop member 77. The carriage 26 would then be in the proper position for receiving an incoming aircraft nose-wheel.

Figure 11A:
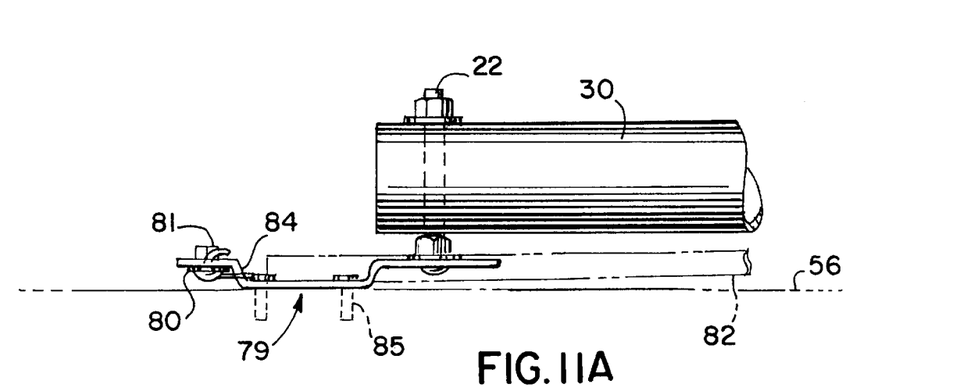
FIG. 11A shows a fragment of the tubular carriage arm and shows the hangar floor mounted bracket on which the arm pivots in solid lines and depicts in phantom lines the reset spring fully stretched and hooked to the floor mounted bracket.
Figure 11B:
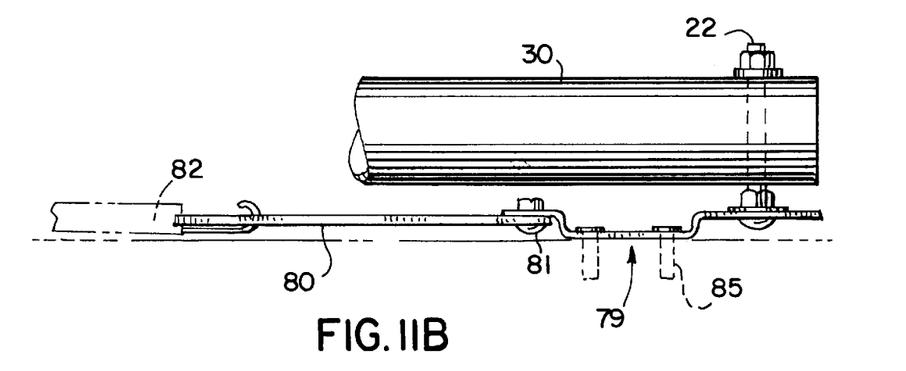
FIG. 11B shows a fragment of the carriage arm, the floor pivot bracket for the arm, and the spring link in solid lines and shows the hooked reset spring in phantom lines in a position corresponding to its phantom line position in FIG. 10B.

In FIG. 11A, which shows an end view of the link 80 to which the spring 32 is attached the link is mounted under the offset end of bracket 79 so that the riser or offset 84 on the bracket acts as a stop for preventing link 80 from turning counterclockwise under the influence of the spring 82 in FIG. 10A. In other words, the link 80 can only turn away from the bracket 79 as is evident from inspection of FIG. 10B. The bracket 79 on which the arm 25 pivots about axis 22 is fastened to the hangar floor 56 by means of two anchor bolts such as the one marked 85 in FIG. 11A. FIG. 11B shows link 80 disposed in line with spring 82 which corresponds to the link shown in phantom lines in FIG. 10B.

In some models, the automatic spring restored chock bar 38 is replaced with an alternate chock bar arrangement, not shown. This alternate chock bar is a separate piece that has nothing connected to it. In this case opposite ends of the chock bar are nested in sockets or recesses, not shown, that allow the chock bar to be installed and removed from interfering position for the nose-wheel. Hence, after the aircraft departs from the carriage and is outside of the hangar, the pilot must get out of the airplane or someone else must restore the simplified chock bar to its sockets so it will be properly positioned for stopping the advance of the aircraft nose-wheel 27 when the aircraft is returned to the hangar its nose-wheel is supported on the carriage. Of course, it would be advisable to remove the chock bar after the aircraft is turned around so that it does not interfere with the nose-wheel as it attempts to roll off the carriage.

It should also be realized that automatic return of the carriage from nose-wheel departure position to nose-wheel accepting position is not intended to be an accessory to all models of the turnaround apparatus. In the absence of the automatic restoration spring for the carriage and its arm it is only necessary for the pilot or another person to push on the carriage to rotate it in its arcuate path by pushing on the carriage.

A valuable advantage of the new turnaround apparatus is that it enables turning the airplane around when its nose-wheel is supported on the carriage and its two main landing wheels are resting on the hangar floor with surprisingly little effort. It is almost safe to say that a child can turn the airplane around with the new turnaround apparatus by pushing on the wing tip or tail whereas, without it, two fairly strong persons must exert considerable effort to turn the aircraft around.

I claim:

1. Apparatus for turning around on a surface an aircraft having a longitudinally extending fuselage including a nose end and a tail end, a wing extending in opposite directions laterally of the fuselage and positioned between the nose end and tail end, a nose-wheel mounted to said nose end, a pair of landing wheels mounted to the aircraft beneath the wings symmetrically relative to the fuselage for rotating about a common horizontal axis and rolling on said surface while said aircraft is being swung about an imaginary vertical turnaround axis extending perpendicularly to a horizontal plane containing the horizontal axis of the landing wheels and intersecting or slightly longitudinally offset from the landing wheels axis, said apparatus comprising:

a member for being fixed to the surface over which the aircraft is to be turned around, a swingable arm having one end portion pivotally mounted to said member for swinging over the surface about a vertical axis coinciding with said aircraft turnaround axis and said arm having an opposite end portion radially spaced from said vertical axis, a carriage mounted to said opposite end portion of the arm and adapted for receiving and supporting the nose-wheel of the aircraft, said carriage having wheels for rolling on said surface along an arcuate path when said arm is being swung about said vertical turnaround axis, swinging of said arm about said turnaround axis after said carriage has received the nose-wheel of the aircraft with the nose portion of the aircraft pointed in one direction causing said carriage to traverse said arcuate path and said landing wheels to orbit on said surface about said turnaround axis such that when said arm swings through 180° said nose portion is pointed in a direction opposite of said one direction.

2. Apparatus for turning an aircraft around according to claim 1 including a chock bar restrainable in a position on said carriage to prevent the nose-wheel moving onto said carriage from overtraveling said carriage and releasable from said position to allow the nose-wheel to run off said carriage.

3. Apparatus for turning an aircraft around according to claim 1 including a chock bar pivotally supported from said carriage, a latching device mounted on said carriage remotely from where said bar is pivoted to provide for said chock bar pivoting in a first direction until it is engaged with said latch and is in a position for blocking the aircraft nose-wheel that is moving onto said carriage against overtraveling the carriage and for pivoting in a direction opposite of said a first direction to release said chock bar from said latch and allow said nose-wheel to roll off said carriage.

4. Apparatus for turning an aircraft around according to claim 1 including:

a chock bar pivotally supported from said carriage and a latch device fixedly supported from said carriage at a distance from where said bar is pivotally supported to provide for said bar to pivot to being releasably engaged with said latch device and said bar is in a position for blocking the aircraft nose-wheel that is moving onto said carriage against overtraveling the carriage, a lever arm connected to said chock bar and a coil spring having one end anchored to the carriage and an opposite end connected to said lever arm for the spring to store a force in response to said chock bar being released from said latch device and swung out of said blocking position and for said spring to restore said chock bar to said latch device when the nose-wheel is clear of the chock bar.

5. The apparatus according to claim 4 wherein said latch device is comprised of a metal bar having opposite end portions formed with a riser between them, one end portion on one side of the riser is fastened to said carriage and the opposite end portion is inclined toward said riser to provide for said chock bar landing on the inclined opposite end portion of the metal bar as the chock bar pivots toward the riser and the chock bar proceeds to drop over the riser for the riser to effect latching of the chock bar.

6. Apparatus for turning an aircraft around according to claim 1 including:

an elongated nose-wheel guide member having one end portion fastened to said carriage and laterally spaced from said swingable arm to provide for the nose-wheel to enter between said carriage and said guide member, the guide member having a main portion extending from said one end portion and angulated for influencing a moving nose-wheel that contacts said main portion to arrive on said carriage.

7. Apparatus for turning an aircraft around according to claim 6 wherein said nose-wheel guide member is a tubular member.

8. Apparatus for turning an aircraft around according to claim 1 wherein said swingable arm is comprised of a first arm section joined longitudinally to a second arm section and said first arm section is pivotally connected to said member that is fixed to said surface and the carriage is fastened to the second arm section.

9. Apparatus for turning an aircraft around according to claim 1 including:

a stop device for decelerating the carriage and for stopping said carriage at an end of said arcuate path through which said carriage moves when swung on said swingable arm over said surface, said stop device comprising a flat springable metal strip having one end portion fastened to said surface and having an opposite end portion inclined upwardly from said surface in a direction opposite of the direction from which said carriage approaches for said carriage to encounter said inclined portion and be decelerated thereby and said strip terminates in a hook such that when said carriage runs over the strip it is deflected to impart a decelerating force to the carriage and assure that the hook will arrest arcuate movement of the carriage by the hook engaging the carriage.

10. Apparatus for turning an aircraft around on a surface according to claim 1 including:

an elongated landing wheel guide member having one end fastened to said swingable arm and angulated from where said one end is fastened away from said arm toward the carriage to provide for diverting a landing wheel that may otherwise be moving toward the carriage when the aircraft is leaving the carriage from colliding with the carriage.

11. Apparatus for turning an aircraft around on a surface according to claim 1 wherein said member that is fixed to said surface and to which said swingable arm is pivotally mounted is a bracket member, a link pivotally connected to said bracket member for swinging in one direction about a vertical axis that is parallel to and offset from the axis about which said swingable arm swings, and a coil spring having one end connected to said link and an opposite end fastened to said swingable arm remotely from the pivot axis of the arm, the force developed in the stretched spring being insufficient to swing the arm when the aircraft is turned around for departure and nose-wheel rests on the carriage but the force of the spring is sufficient to swing the arm after the aircraft departs to a position where the carriage is in readiness to receive the nose-wheel of the aircraft.

12. Apparatus for turning around on a surface an aircraft of the type that has a nose-wheel and two laterally spaced apart landing wheels rotatable about a horizontal axis spaced rearwardly of the aircraft from the nose-wheel for turning about a common axis, the apparatus comprising:

an arm mounted for swinging about a vertical pivot axis over the surface and a carriage to which the arm is connected at a place radially remote from the vertical pivot axis, the carriage having wheels for running on said surface along an arcuate path defined by swinging the arm about said vertical pivot axis, said carriage being movable with said arm to a first angular position about said vertical pivot axis for running the nose-wheel of the aircraft onto said carriage with the aircraft pointed in one direction resulting in an imaginary vertical axis that passes perpendicularly through a plane containing said horizontal axis of the landing wheels and is at equal distances from each landing wheel becoming substantially coincident with the vertical pivot axis of the arm such that when the arm and carriage with nose-wheel thereon are moving from said first angular position toward a second angular position wherein said aircraft is pointed in a second direction opposite of said first direction said landing wheels roll on said surface along a circular path concentric to said coincident vertical axes.

13. Apparatus according to claim 12 including a chock bar adapted for being moved to a position on said carriage in which the bar interferes with the nose-wheel overtraveling the carriage when the wheel rolls onto the carriage and for being moved to a noninterfering position to permit the nose-wheel to run off the carriage.

14. Apparatus according to claim 12 wherein said arm is tubular.

15. Apparatus according to claim 12 wherein there are axles mounted to said carriage on which axles said wheels of the carriage rotate and the axes of the axles project to intersection with the vertical pivot axis about which the arm swings.

16. Apparatus according to claim 12 including an elongated nose-wheel guide member having an end portion fastened to the carriage and a portion continuing from the end portion that is angulated away from the carriage for deflecting a nose-wheel that is approaching out of alignment with the carriage into alignment with the carriage.

17. Apparatus according to claim 12 including an elongated landing wheel guide member fastened to said arm proximate the carriage and fastened to the carriage at an angle relative to the arm to provide for deflecting a landing wheel that is moving in alignment with the carriage when the nose-wheel is driven off the carriage away from the carriage.

18. Apparatus according to claim 12 with provisions for automatic restoration of said arm and carriage to said first angular position after the aircraft departs from the apparatus to permit the nose-wheel to run onto said carriage, including:

a bracket member fastened to said surface, said arm being mounted to the bracket member for swinging about said vertical pivot axis, a link mounted to said bracket member for swinging about a vertical axis that is parallel to and offset from the axis about which the arm swings, a coil spring having one end connected to said link at a distance from its axis and having an opposite end connected to said arm remotely from the axis of the arm, said link being blocked at a right angle to said arm after the arm is swung to a second angular position corresponding to the aircraft having been turned around such that said spring is fully stretched and can not contract to swing the arm while the weight of the nose-wheel is bearing on the carriage, running of the nose-wheel off the carriage allowing the force stored in the stretched spring to act through the moment arm of the link to exert a rotational force sufficient to swing the arm and restore the arm and the carriage to said first angular position.

19. Apparatus according to claim 18 including a stop device for stopping said arm and carriage from being swung beyond said first angular position, the device comprising a spring bar member having an end portion fixed to said surface proximate to the first angular position for the carriage and a continuation of the end portion inclined at an angle relative to the surface in the direction along the arc in which said carriage moves to reach said first angular position for the carriage to contact said inclined portion and be decelerated thereby, said continuation terminating with a hook and being deflected by the oncoming carriage running onto it to assure that the hook will engage and stop the carriage in the first angular position.

* * * * *